United States Patent [19]

Sheckler et al.

[11] Patent Number: 5,215,686
[45] Date of Patent: Jun. 1, 1993

[54] DIFFUSER BODY AND METHOD OF MANUFACTURE

[75] Inventors: Chad A. Sheckler, Phelps; Harry C. Stanton, Rochester, both of N.Y.

[73] Assignee: Refractron Technologies Corporation, Newark, N.Y.

[21] Appl. No.: 920,792

[22] Filed: Jul. 28, 1992

[51] Int. Cl.⁵ ............................................. B01F 3/04
[52] U.S. Cl. ................................. 261/122.1; 501/80
[58] Field of Search ....................... 261/122.1; 501/80

[56] References Cited

U.S. PATENT DOCUMENTS

| | | | |
|---|---|---|---|
| 3,507,253 | 4/1970 | Willinger | 261/122.1 |
| 3,689,611 | 9/1972 | Hardy et al. | 501/80 |
| 3,753,746 | 8/1973 | Koerner | 261/122.1 |
| 4,046,845 | 9/1977 | Veeder | 261/122.1 |
| 4,118,450 | 10/1978 | Nakamura et al. | 501/80 |
| 4,184,885 | 1/1980 | Pasco et al. | 501/80 |
| 4,261,932 | 4/1981 | Ewing et al. | 501/80 |
| 4,746,341 | 5/1988 | Komoda | 501/80 |
| 4,820,412 | 4/1989 | Rudolphi et al. | 261/122.1 |
| 4,965,230 | 10/1990 | Nakajima et al. | 501/80 |

*Primary Examiner*—Tim Miles
*Attorney, Agent, or Firm*—Howard J. Greenwald

[57] ABSTRACT

A rigid, monolithic, porous gas diffusion element which is formed of a body of solid particles and which is comprised of a partially coated, permeable ceramic substrate is disclosed. The substrate consists essentially of a porous first ceramic material, has an apparent porosity of from about 35 to about 50 percent, and has a minimum active pore size of from about 40 to about 120 microns; and it is partially coated with a coating which consists essentially of a second ceramic material, has an apparent porosity of from about 35 to about 55 percent, and has a minimum active pore size of from about 10 to about 40 microns. The minimum active pore size of the substrate is from about 2 to about 5 times as great as the minimum active pore size of the coating.

18 Claims, 2 Drawing Sheets

DIFFUSER BODY AND METHOD OF MANUFACTURE

FIELD OF THE INVENTION

A ceramic diffuser body containing a ceramic substrate and a ceramic coating on the top surface of the substrate is disclosed.

BACKGROUND OF THE INVENTION

Porous gas diffusion elements are well known to those skilled in the art. Thus, for example, they are disclosed in U.S. Pat. Nos. 4,261,932, 4,261,933, and 4,288,935; the disclosure of each of these patents is hereby incorporated by reference into this specification.

These prior art porous gas diffusers are often used to diffuse a gas (such as oxygen, ozone, air, carbon dioxide, or nitrogen) into a liquid (such as waste water or drinking water). An ASCE Standard Test ("Measurement of Oxygen Transfer in Clean Water," Jul., 1984, ISBN 0-87262-430-7) was developed by the American Society of Civil Engineers to evaluate the efficiencies of these prior art devices.

A substantial amount of energy is required to force gas through such porous gas diffusers. The efficiencies of the prior art gas diffusion devices ranged from about 10 to about 40 percent. Thus, even a relatively small increase in such efficiency will result in a significant decrease in energy consumption.

It is an object of this invention to provide a porous gas diffuser with an increased gas transfer efficiency.

It is yet another object of this invention to provide a porous gas diffuser whose output is substantially uniform along its active surface.

It is yet another object of this invention to provide a porous gas diffuser which, when connected a source of gas, is less likely to leak such gas from a source other than the active surface of the diffuser.

SUMMARY OF THE INVENTION

In accordance with this invention, there is provided a ceramic diffuser body which contains a ceramic substrate coated with a ceramic membrane. The minimum active pore size of the substrate is from about 2 to about 5 times as great as the minimum active pore size of the ceramic membrane.

BRIEF DESCRIPTION OF THE DRAWINGS

The present invention will be more fully understood by reference to the following detailed description thereof, when read in conjunction with the attached drawings, wherein like reference numerals refer to like elements, and wherein.

DESCRIPTION OF THE PREFERRED EMBODIMENTS

Figure 1:
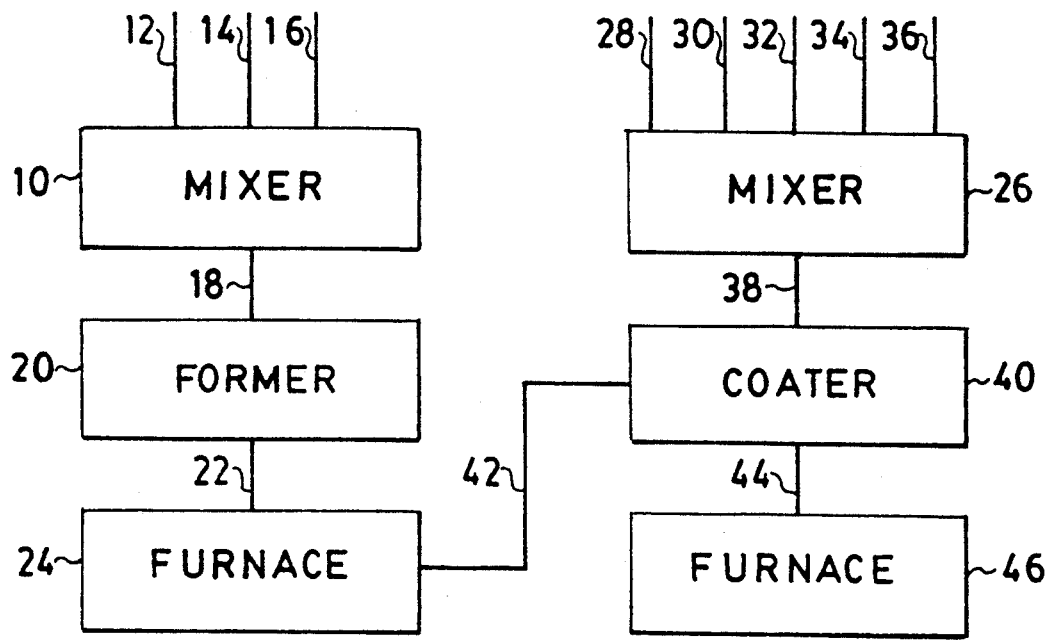
FIG. 1 is a flow diagram of one preferred process of the instant invention.

FIG. 1 illustrates one preferred process for producing the diffuser body of this invention.

Referring to FIG. 1, to mixer 10 is charged aggregate material and bonding agent. The aggregate material is preferably charged via line 12. The bonding agent is charged via line 14.

In one preferred embodiment, which is illustrated in the drawings and referred to in the remainder of this specification, the aggregate material consists essentially of ceramic material.

The ceramic material charged via line 12 preferably has a particle size distribution such that at least about 99 weight percent of its particles have a maximum dimension which is from about 150 to about 1,000 microns. In one embodiment, at least about 99 weight percent of the ceramic aggregate particles charged via line 12 have a maximum dimension of at least about 250 microns.

The ceramic aggregate material charged via line 12 preferably has a shrinkage such that, after it is formed into a green body with a substantially circular cross-section and a diameter of 7.0 inches and fired at a temperature of 1,225 degrees Centigrade for 1 hour, will exhibit a shrinkage of less than about 1.0 percent. The shrinkage of the material may be determined by measuring the diameter of body prior to and after firing.

From about 80 to about 95 weight percent (by combined weight of ceramic aggregate material and bonding agent) is charged to mixer 10 via line 12; and from about 20 to about 5 weight percent of bonding agent is charged to mixer 10 via line 14.

In one preferred embodiment, the ceramic material charged via line 12 is selected from the group consisting of alumina, silicon carbide, silica, mullite, zirconium silicate, and the like.

In one embodiment, the ceramic material charged via line 12 is silica, which often consists of naturally occurring sand particles. An amorphous glass binder may be added to the silica (via line 14); see, e.g., page 2 of EPA/625/8-85/010 Summary Report, "Fine Pore (Fine Bubble) Aeration Systems" (developed by the Water Engineering Research Laboratory, Cincinnati, Ohio).

In one embodiment, the ceramic material charged via line 12 is an alumina material such as, e.g., a 46 grit alumina sold by General Abrasive Treibacher, Inc. of Niagara Falls, New York. An elaborate binder, resembling porcelain, may be charged via line 14; see, e.g., page 3 of said E.P.A. report.

In one embodiment, the ceramic material charged via line 12 is zircon ($ZrSiO_4$). In another embodiment, the ceramic material charged via line 12 is silicon carbide.

Mullite may be used as the ceramic material charged via line 12. As is known to those skilled in the art, mullite is an aluminosilicate of the formula $3Al_2O_3.2SiO_2$.

It is preferred to use alumina as the ceramic aggregate material charged via line 12, and reference will be made to such alumina in the remainder of this specification.

In addition to the alumina (which is charged via line 12), from about 5 to about 20 weight percent of a bonding agent is charged via line 14. This bonding agent consists essentially of inorganic material, all of whose particles have a maximum dimension smaller than about 100 microns. The bonding agent preferably forms a glassy phase when subjected to a temperature of 1,225 degrees for at least 1 hour.

In one preferred embodiment, a borosilicate glass is used as the bonding agent. This borosilicate glass may be formed by combining a borosilicate frit and nepheline syenite in a mixture which contains from about 20 to about 50 weight percent of borosilicate frit and from about 50 to about 80 weight percent of nepheline syenite.

In one preferred embodiment, the bonding agent charged via line 14 is a mixture of from about 20 to about 50 weight percent of a clay material and from about 80 to about 50 weight percent of a material selected from the group consisting of feldspar, nepheline syenite, and mixtures thereof. The clay material preferably has a particle size such that substantially all of its particles have a maximum dimension smaller than about 10 microns; and it may, e.g., be ball clay or bentonite. The feldspar and/or the nepheline syenite material preferably has a particle size such that substantially all of its particles are smaller than 40 microns.

In one embodiment, the bonding agent also contains from about 20 to about 50 weight percent of glass frit.

The ceramic aggregate material and the bonding agent are mixed in mixer 10, preferably by dry mixing, until a substantially homogeneous mixture is obtained therein. Any of the mixers known to those skilled in the art may be used. Thus, e.g., one may use an Eirich R7 Mixer (Eirich Machines, Ltd., Box 550, Maple, Ontario).

After the desired dry mixture of ceramic material and binding agent has been obtained in mixer 10, it is preferred to charge thereto via line 16 from about 3 to about 6 weight percent of a green binder which, preferably, is in liquid form. Some suitable binders which may be used are described on page 153 of James S. Reed's "Introduction to the Principles of Ceramic Processing" (John Wiley and Sons, New York, 1988).

By way of illustration, one may use as a green binder an emulsion of paraffin in water, a Carbowax solution in water, polyvinyl alcohol, dextrine, and the like. In one embodiment, it is preferred to use from about 3 to about 8 weight percent of a combination of dextrine and Mobilcer J wax. Thus, in this embodiment, e.g., one may add from about 2 to about 4 weight percent of each of dextrine and Mobilcer J wax.

After the binder has been added via line 16, the mixture is then stirred until it is substantially homogeneous. Thereafter, the mixture is discharged via line 18 to former 20.

Any conventional means can be used to form the mixture in former 20. Thus, by way of illustration and not limitation, former 20 may be a press equipped with a die in the shape of a plate, a dome, or a disc. Any suitable press may be used such as, e.g., the 30-ton presses sold by the Fred S. Carver Inc. of Menomonee Falls, Wisconsin.

The green body produced by former 20 may be in the form of a plate with a thickness of from about 1.0 to about 1.5 inches thick. The plate may have a shape which is square, or rectangular.

Alternatively, the green body produced by former 20 may be in the form of a disc with a diameter of from about 6 to about 12 inches and a thickness of from about 0.5 to about 2.0 inches. In one embodiment, the thickness of the disc is from about 0.5 to about 1.0 inches. In one embodiment, the diameter of the disc is either 7 inches, or 9 inches, or 9.5 inches, or 12 inches. See, e.g., page 6 of said E.P.A. report.

It is preferred that the green body produced in former 20 be in the shape of a dome, resembling a circular disk with a downwardly turned edge. In one embodiment, these domes are also from about 6 to about 12 inches in diameter and from about 0.5 to about 2.0 inches thick. In one embodiment, the dome is about 7.0 inches in diameter and 1.5 inches high; in this embodiment, the media is 0.6 inches thick on the edges and 0.75 inches thick on the top or flat surface. See, e.g., page 5 of said E.P.A. report and a publication by D. H. Houbk et al. entitled "Survey and Evaluation of Fine Bubble Dome Diffuser Aeration Equipment," EPA-600/2-81-222, NTIS no. PB82-105578 (United States Environmental Protection Agency, Cincinnati, Ohio, Sep., 1981). In another embodiment, the dome has a diameter of about 9 inches. In yet another embodiment, the dome has a diameter of about 12 inches.

The green body formed in former 20 is then passed via line 22 to furnace 24, where it is heated to a temperature of 1,225 degrees Centigrade and maintained at at least this temperature for at least 1 hour. It is preferred to heat the green body in air at a temperature of from about 1,225 to about 1,275 degrees Centigrade for at least about 8 hours. Thereafter, the heated body is then allowed to cool, preferably while in furnace 24.

Any conventional furnace may be used to heat the green body. Thus, e.g., one may use a tunnel kiln sold by the Lindberg Company, 304 Hart Street, Watertown, Wisconsin.

The materials required to produce an inorganic coating for the green body from furnace 24 may be charged to mixer 26. It is preferred that the mixture formed in mixer 26 have a coefficient of expansion which is from about 0.9 to about 1.1 times as great as the coefficient of expansion of the mixture formed in mixer 24.

Ceramic aggregate material is charged via line 28 to mixer 26. It is preferred that the ceramic aggregate material charged via line 28 be chemically identical to the ceramic aggregate material charged via line 12. However, the aggregate material charged via line 28 has a particle size distribution such that substantially all of its particles have a maximum dimension less than about 150 microns and, more preferably, less than about 50 percent of the size of the mean particle size of the ceramic aggregate material charged via line 12. By way of illustration, in one embodiment the alumina charged via line 12 has a mean particle size of greater than 250 microns, and the alumina charged via line 28 has a mean particle size of about 95 microns.

Bonding agent is charged to mixer 26 via line 30. It is preferred that a sufficient amount of such bonding agent be charged so that the mixer 26 contains from about 80 to about 95 weight percent of ceramic aggregate material and from about 20 to about 5 weight percent of bonding agent. A similar, or identical bonding agent may be charged via line 30 as is charged via line 14; it is preferred that the binding charged in the former line be identical to the binding agent charged via the latter line.

A sufficient amount of water is charged to mixer 26 via line 32 so that the slurry formed in such mixer has a solids content of from about 40 to about 60 weight percent.

Less than about 1.0 weight percent (and preferably less than about 0.1 weight percent) of surfactant may be added to mixer 26 via line 34. If such surfactant is used, it preferably is an anionic surfactant. Thus, e.g., one may use "DARVAN" 821A polyacrylate surfactant, which is sold by the R. T. Vanderbilt and Company of Norwalk, Connecticut.

From about 0.25 to about 0.5 weight percent of a suspending agent is added to mixer 26 via line 36. The function of this suspending agent is to suspend and maintain a mixture of the particulate components homogeneously. One may use suspending agents such as, e.g., Xanthan gum.

The ingredients are mixed in mixer 26 until a substantially homogeneous slurry is produced. Thereafter, the slurry is discharged via line 38 to coater 40. It is preferred that substantially all of the particles in the slurry are smaller than about 125 microns and, more preferably, less than about 100 microns.

The green body from furnace 24 is passed via line 42 to coater 40. Its interior surface (see FIG. 2) is masked, and the top surface of the green body is dipped into the slurry; thus, the green body is only partially coated with the slurry. The partially coated green body is then removed from coater 40, the top surface is then allowed to dry, and then the green body is again dipped into the slurry in order to coat the bottom surface of the green body. Thereafter, the partially coated green body is again removed from the coater 40 and allowed to dry.

The partially coated green body is then removed from coater 40 and charged via line 44 to furnace 46, where it is fired in accordance with the procedure used in furnace 24. It is preferred to heat the coated green body at a temperature of from about 1,225 to about 1,275 degrees Centigrade for at least about 1 hour and, more preferably, for at least about 8 hours.

Figure 2:
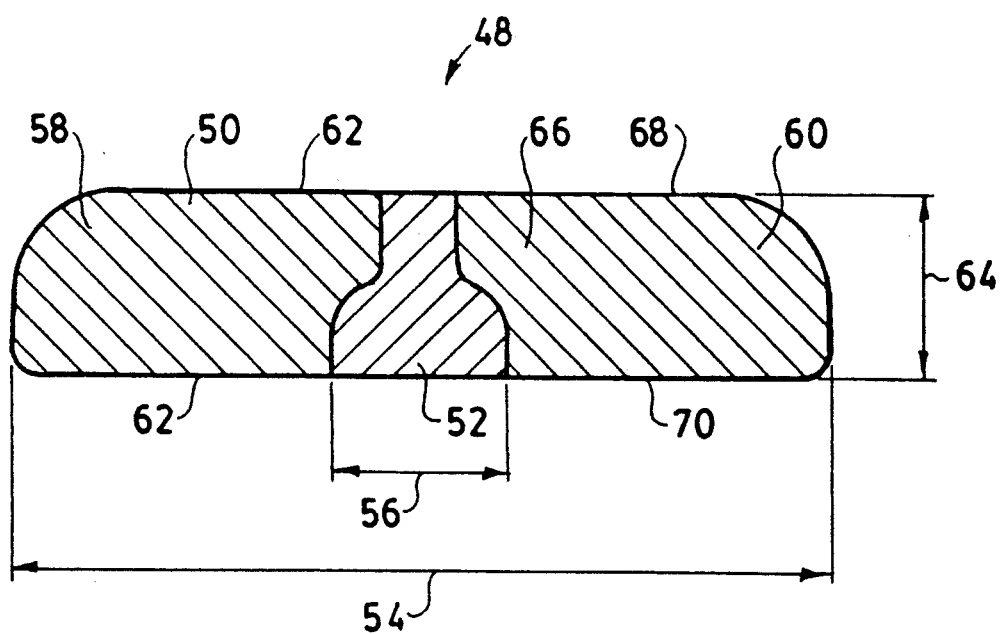
FIG. 2 is a sectional view of one preferred diffuser of the instant invention.

A sectional view of one preferred porous gas diffuser body is illustrated in FIG. 2. Referring to FIG. 2, it will be seen that, in this embodiment, diffuser 48 is preferably a dome-shaped body 50 comprised of gas inlet orifice 52. The diameter 54 of body 50 is at least about 3.0 times as large as the maximum diameter 56 of gas inlet orifice 52; and the cross-sectional area of the solid portion of body 50 (the sum of the areas of sections 58 and 60) is at least about 3.5 times as great as the cross-sectional area of the hatched orifice area 52.

In the embodiment illustrated in FIG. 2, the coating is prepared form alumina and a bonding agent containing about 30 weight percent of ball clay and 70 weight percent of nepheline syenite. In this embodiment, the coating 62 has a thickness which is from about 0.1 to about 1.0 millimeters and, generally, is less than about 5 percent of the thickness 64 of the substrate 66. In one preferred embodiment, the maximum thickness of substrate 66 is 1.5 inches, and the coating 62 has a thickness of from about 0.4 to about 0.6 millimeters.

The substrate 66 preferably has an apparent porosity of from about 35 to about 50 percent; as is known to those skilled in the art, apparent porosity is the relationship of the open pore space to the bulk volume, expressed in percent (see A.S.T.M. C242-87,). The coating 62 also has an apparent porosity of from about 35 to about 55 percent. Although the porosity of the coating 62 may be identical to or smaller than the porosity of substrate 66, it often is at least about 2.0 percent higher than the porosity of substrate 66.

The substrate 66 must have sufficient strength for its intended use. In one embodiment, the substrate 66 has a strength of at least about 1,000 pounds per square inch. For discs and domes, measurement of strength usually involves supporting the diffuser in a fashion similar to that used for the final assembly and then applying a 1,000 pound load to a 25 millimeter (1.0 inch) diameter area in the center of the diffuser.

The minimum active pore size of substrate 66 is greater than the minimum active pore size of coating 62. As used in this specification, the term minimum active pore size refers to the smallest pore in the diffuser which is actively diffusing gas into the liquid medium. As is known to those skilled in the art, the pore size distribution of a porous body may be determined in accordance with A.S.T.M. Standard Test Method F316-86, "Test Method for Pore Size Characteristics of Membrane Filters for Use with Aerospace Fluids." In this test, porous bodies are mounted on a gas plenum and immersed in a liquid of known surface tension. The plenum is slowly pressurized, and observations are made of the pressure at which the first bubble is released from the body at various gas flow rates.

The minimum active pore size of substrate 66 is generally from about 40 to about 120 microns. The minimum active pore size of coating 62 is generally from about 10 to about 40 microns. In general, the minimum active pore size of substrate 66 is from about 2.0 to about 5.0 times as great as the minimum active pore size of coating 62. It is preferred that the minimum active pore size of substrate 66 be from about 2.0 to about 4.0 times as great as the minimum active pore size of coating 62. In one preferred embodiment, the minimum active pore size of substrate 66 is about 3.0 times as great as the minimum active pore size of coating 62.

Referring again to FIG. 2, in one preferred embodiment, the minimum active pore size of the coating 62 on the top surface 68 of substrate 66 is at least about 2.0 times as great as the minimum active pore size of the coating 62 on the bottom surface 70 of substrate 66. This difference in minimum active pore size may be obtained, e.g., by using different particle size materials to coat the top and bottom surfaces of the substrate. To activate the top surface for diffusion while maintaining a seal on the bottom surface, a coarser membrane may be used on the top. This may be achieved, e.g., by using a coarser grade of ceramic aggregate for the top surface membrane, and using a finer grade of ceramic aggregate for the bottom surface membrane.

Figure 3:
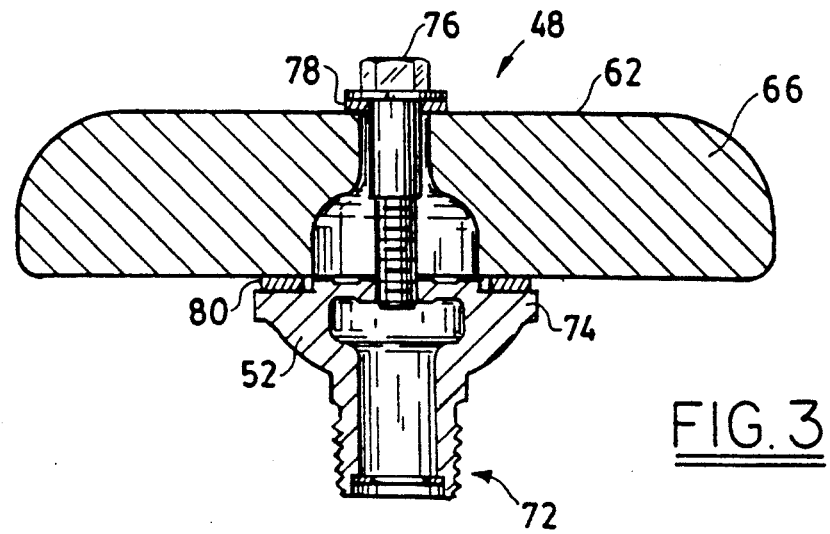
FIG. 3 is a sectional view of the diffuser of FIG. 2 connected to a source of gas; and Each of FIGS. 4 and 5 is a sectional view of another preferred diffuser of the instant invention.

FIG. 3 illustrates the diffuser body 48 of FIG. 2 connected to a source of gas 72; this embodiment is especially suitable for diffusing ozone gas. Referring to FIG. 3, it will be seen that diffuser body 48 is attached to inlet casting 74 by means of bolt 76, gasket 78, and gasket 80. In this embodiment, bolt 76 is preferably a stainless steel bolt. Gaskets 78 and 80 are preferably an ozone resistant elastomeric material such as "HYPALON" 70 (a chloosulfonated polyethylene sold by the Du Pont de Nemours and Company of Wilmington, Delaware).

As is disclosed on pages 22–24 of EPA/625/1/-89/023"Design Manual: Fine Pore Aeration Systems," United States Environmental Protection Agency, Center for Environmental Research Information, Cincinnati, Ohio, the uniformity of individual diffusers, and the entire aeration system, is important if high oxygen transfer efficiencies are to be attained.

The uniformity of the diffuser body may be tested with a visual test. Alternatively, or additionally, the uniformity of the diffuser may be tested with the uniformity tests described the Environmental Protection Agency's "Design Manual—Fine Pore Aeration Systems" (EPA/625/1-89/023, published in 1989 by the Center for Environmental Research Information, Risk Reduction Engineering Laboratory, Cincinnati, Ohio). One such uniformity test measures the water displaced from an inverted graduated cylinder in a given period of time and compares the flow rate so determined for a specific location above the diffuser to other areas. A diffuser's uniformity can be measured by comparing the values for different areas of its active surface.

Figure 4:
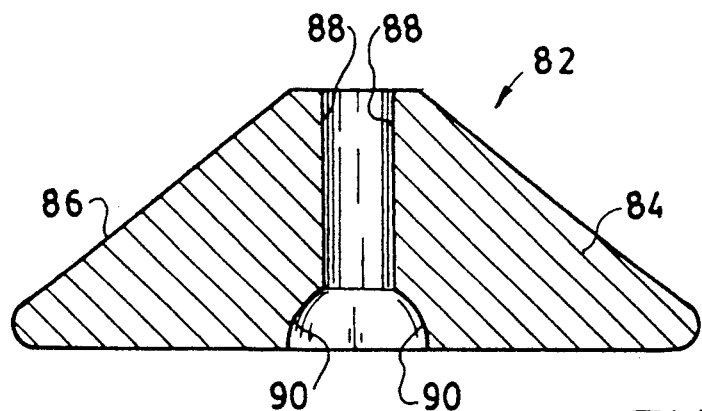

FIG. 4 is a sectional view of another preferred embodiment of applicant's invention, illustrating a conically-shaped diffuser body. This sectional view, like the sectional views depicted in FIGS. 2 and 3, was taken through a section taken through the centerpoint of the top surface of the diffuser body.

Referring to FIG. 4, diffuser body 82 is comprised of substrate 84 and coating 86, which are similar to the substrate 66 and coating 62 depicted in FIGS. 2 and 3. As with the diffuser body of FIGS. 2 and 3, the coating 86 is not applied to the interior surfaces 88 and 90 of the diffuser body 82.

Figure 5:
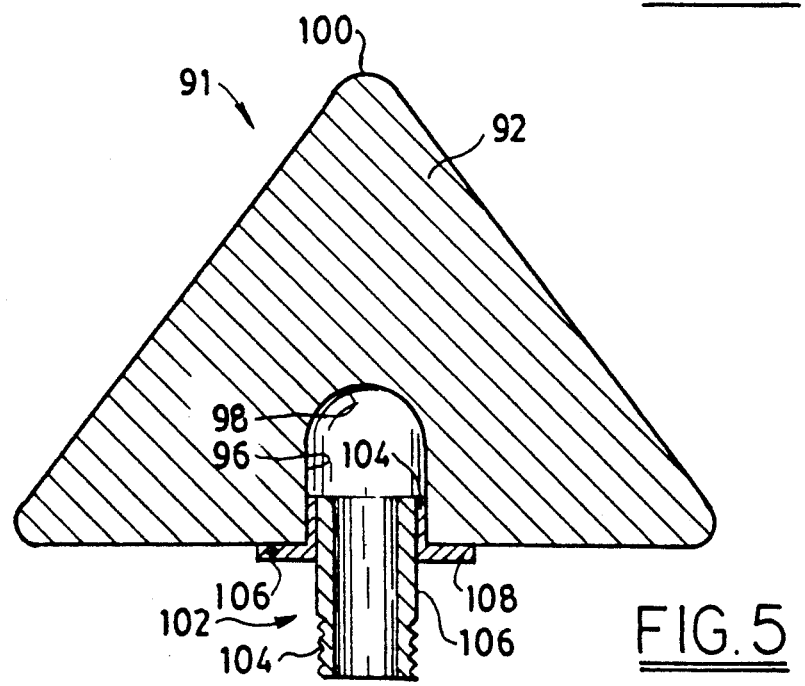

FIG. 5 is a sectional view of another preferred embodiment of applicant's invention, illustrating another conically-shaped diffuser body 91. Referring to FIG. 5, it will be seen that substrate 92 is coated with coating 94 over substantially every exterior surface except for exterior surfaces 96 and 98. Thus, unlike the embodiment of FIG. 3, the tip 100 contains operative diffusing material (coating 94).

An adaptor, such as adaptor 102, is connected to substrate 92 by conventional means such as, e.g., adhesive 104, adhesive 106, and adhesive 108. In the preferred embodiment illustrated in FIG. 5, adaptor 102 preferably contains pipe threads 104 and a flat section 106 which a wrench may grasp.

The adaptor 102 may be made from conventional materials such as, e.g., plastic material (such as polyvinyl chloride), metal material (such as stainless steel), and the like.

It will be apparent to those skilled in the art that the self-supporting diffuser head embodiments of applicant's invention are substantially less expensive than the prior art devices which required fabricated holders (which often consisted of plastic or stainless steel) and which usually communicated with precise orifices and often presented leakage problems at the junctures of the holders and the diffuser bodies. Applicant's devices are substantially less likely to present such leakage problems and are greatly simplified structures.

It will also be apparent to those skilled in the art that applicant's invention is not limited to diffuser bodies with the shapes depicted in FIGS. 2, 3, 4, and 5. Thus, differently shaped diffuser bodies may be made in accordance with applicant's invention such as, e.g., diffuser bodies with the shape of disks, square plates, rectangles, and prismatic shapes.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

I claim:

1. A rigid, monolithic, porous gas diffusion element which is formed of a body of solid particles and which is comprised of a partially coated, permeable ceramic substrate, wherein:
   (a) said substrate is an integral structure comprised of a top substrate surface, a bottom substrate surface, and an orifice extending upwardly from bottom substrate surface and defining an interior substrate surface, wherein the maximum dimension of said substrate is at least 3 times as large as the maximum dimension of said orifice;
   (b) said substrate consists essentially of a porous first ceramic material, has an apparent porosity of from about 35 to about 50 percent, and has a minimum active pore size of from about 40 to about 120 microns;
   (c) said substrate is coated with a coating which is bonded to and extends over said top substrate surface and said bottom substrate surface, wherein:
      1. said coating is not bonded to and does not extend over said interior substrate surface;
      2. said coating consists essentially of a second ceramic material, has an apparent porosity of from about 35 to about 55 percent, and has a minimum active pore size of from about 10 to about 40 microns; and
      3. the minimum active pore size of said substrate is from about 2 to about 5 times as great as the minimum active pore size of said coating.

2. The gas diffusion element as recited in claim 1, wherein said gas diffusion element is dome-shaped.

3. The gas diffusion element as recited in claim 2, wherein said first ceramic material is comprised of at least about 80 weight percent of alumina.

4. The gas diffusion element as recited in claim 3, wherein said second ceramic material is comprised of at least about 80 weight percent of alumina.

5. The gas diffusion element as recited in claim 4, wherein said gas diffusion element has a diameter of from about 6 to about 12 inches.

6. The gas diffusion element as recited in claim 5, wherein said orifice has a diameter of from about 1.5 to about 2.5 inches.

7. A gas diffusion apparatus comprised of a rigid, monolithic, porous gas diffusion element which is formed of a body of solid particles and which is comprised of a partially coated, permeable ceramic substrate, and means for supplying gas to said gas diffusion element, wherein:
   (a) said substrate is an integral structure comprised of a top substrate surface, a bottom substrate surface, and an orifice extending upwardly from bottom substrate surface and defining an interior substrate surface, wherein the maximum dimension of said substrate is at least 3 times as large as the maximum dimension of said orifice;
   (b) said substrate consists essentially of a porous first ceramic material, has an apparent porosity of from about 35 to about 50 percent, and has a minimumn active pore size of from about 40 to about 120 microns;
   (c) said substrate is coated with a coating which is bonded to and extends over said top substrate surface and said bottom substrate surface, wherein:
      1. said coating is not bonded to and does not extend over said interior substrate surface;
      2. said coating consists essentially of a second ceramic material, has an apparent porosity of from about 35 to about 55 percent, and has a minimum active pore size of from about 10 to about 40 microns; and
      3. the minimum active pore size of said substrate is from about 2 to about 5 times as great as the minimum active pore size of said coating.

8. The gas diffusion apparatus as recited in claim 7, wherein said gas diffusion element is dome-shaped.

9. The gas diffusion apparatus as recited in claim 8, wherein said first ceramic material is comprised of at least about 80 weight percent of alumina.

10. The gas diffusion apparatus as recited in claim 9, wherein said second ceramic material is comprised of at least about 80 weight percent of alumina.

11. The gas diffusion apparatus as recited in claim 10, wherein said gas diffusion element has a diameter of from about 6 to about 12 inches.

12. The gas diffusion apparatus as recited in claim 11, wherein said orifice has a diameter of from about 1.5 to about 2.5 inches.

13. A process for preparing a gas diffusion element, comprising the steps of:
   (a) mixing from about 80 to about 95 weight percent of a first ceramic aggregate with from about 20 to about 5 weight percent of a first bonding agent, wherein:
      1. at least about 99 weight percent of the particles of said first ceramic aggregate have a maximum dimension of from about 150 to about 1,000 microns;
      2. said first ceramic aggregate, after being formed into a green body with a substantially circular-cross section and a diameter of 7 inches and being heated at a temperature of 1,225 degrees Centigrade for 1 hour, has a shrinkage of less than about 1.0 percent; and
      3. all of the particles of said bonding agent are smaller than about 100 microns;
   (b) adding from about 3 to about 6 weight percent of a binder to said mixture of ceramic aggregate and binding agent, thereby producing a green body mixture;
   (c) forming said green body mixture into a green body;
   (d) subjecting said green body to a temperature of at least about 1,225 degrees Centigrade for at least about 1.0 hour, thereby producing a rigid body; and
   (e) coating the top surface and the bottom surface of said rigid body with an aqueous slurry comprised of at least 40 weight percent of solid material, wherein:
      1. said solid material is comprised of from about 80 to about 95 percent of a second ceramic aggregate material and from about 20 to about 5 percent of a second bonding agent; and
      2. substantially all of the particles of said second ceramic aggregate material are smaller than about 150 microns.

14. The process as recited in claim 13, wherein said first ceramic aggregate consists essentially of alumina with a particle size distribution such that substantially all of its particles are larger than about 250 microns.

15. The process as recited in claim 14, wherein said second ceramic aggregate consists essentially of alumina with a particle size distribution such that substantially all of its particles are smaller than 125 microns.

16. The process as recited in claim 15, wherein said first bonding agent and said second bonding agent are substantially chemically identical.

17. The process as recited in claim 16, wherein said green body is subjected to a temperature of from about 1,225 to about 1,275 degrees Centigrade for at least about 8 hours.

18. The process as recited in claim 17, wherein said green body is formed by pressing.

* * * * *